United States Patent [19]

Gussman et al.

[11] 3,994,153
[45] Nov. 30, 1976

[54] VARIABLE FLOW RESISTANCE CALIBRATOR

[76] Inventors: Robert A. Gussman; Gertrude Gussman, both of 58 Guinan St., Waltham, Mass.. 02154

[22] Filed: July 22, 1975

[21] Appl. No.: 598,064

[52] U.S. Cl. .................................... 73/3; 138/46
[51] Int. Cl.² ........................................ G01F 25/00
[58] Field of Search ............... 73/28, 1 R, 3, 38; 138/46; 137/625.31

[56] References Cited
UNITED STATES PATENTS

| | | | |
|---|---|---|---|
| 1,023,739 | 4/1912 | Joyce | 73/3 |
| 2,701,467 | 2/1955 | Strong et al. | 73/28 X |
| 2,909,920 | 10/1959 | Emmons | 73/3 |
| 3,295,359 | 1/1967 | Peck | 73/28 |

FOREIGN PATENTS OR APPLICATIONS 111,648  8/1944  Sweden ......................... 137/625.31

*Primary Examiner*—Charles A. Ruehl
*Attorney, Agent, or Firm*—Wolf, Greenfield & Sacks

[57] ABSTRACT

The calibrator device is used for calibrating the flow indicator (rotometer) of an air pollution sampling instrument known as a high volume air sampler which determines the concentration of the total suspended particulate in the ambient atmosphere. The calibrator is of cylindrical shape having an annular passage and centrally disposed knob at one end and a pair of aperture plates at the other end, one of which is fixed in position and the other one of which is rotatable by means of the knob. Each calibrator defines a flow characteristic represented by a graph of flow versus orifice pressure, and by setting the flow resistance at different sequential values by rotation of the knob a plot is established of true air flow in cubic feet per minute (cfm) versus observed flow meter reading.

20 Claims, 5 Drawing Figures

FIG. 1
FIG. 2
FIG. 3
FIG. 4
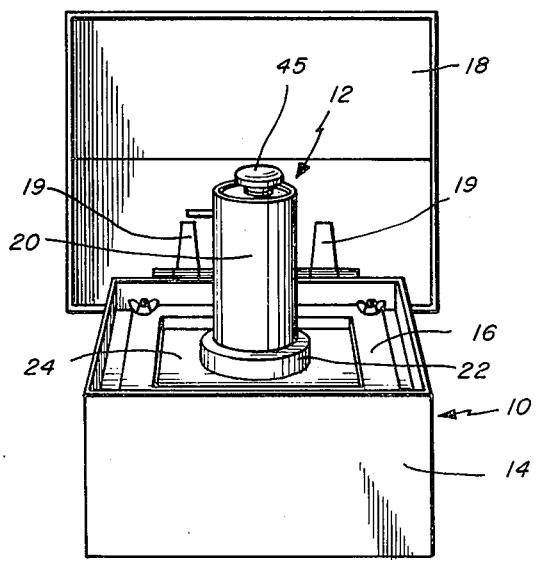
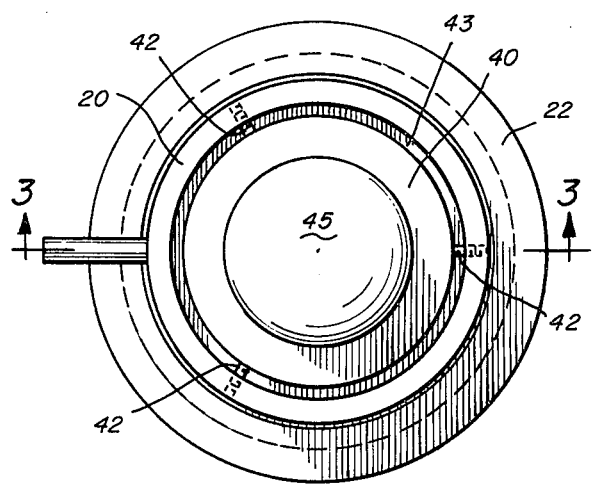
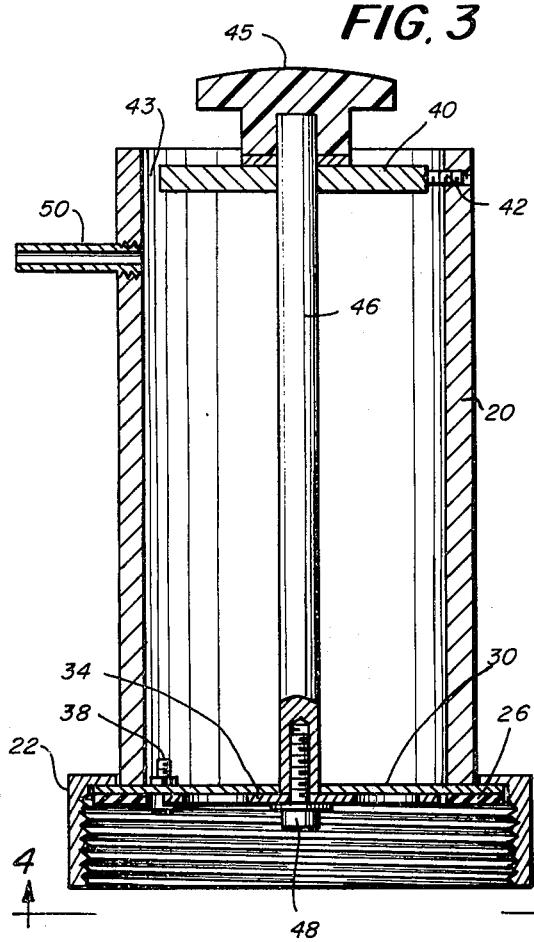
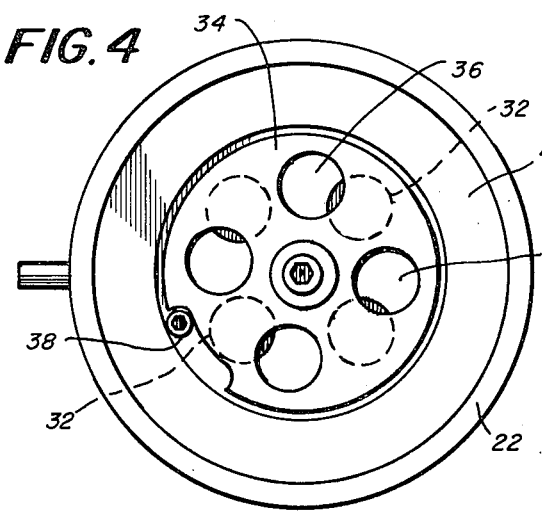

VARIABLE FLOW RESISTANCE CALIBRATOR

BACKGROUND OF THE INVENTION

The present invention relates to a variable flow resistance calibrator which is used for calibrating the flow indicator of a high volume air sampler.

A high volume air sampler is a conventional apparatus for determining the concentration of total suspended particulate in the ambient atmosphere. The apparatus generally comprises a filter, a blower or motor driven fan, and a rotometer. The rotometer is preferably an inexpensive device including an air column and known weight ball. A calibrator is used with this apparatus so that a plot can be established associated with the apparatus correlating the observed flow meter reading with the true air flow in cubic feet per minute.

The rotometer, as previously mentioned, may simply be a tube having a ball of known weight therein with the height that the ball is raised being a function of the air flow. Typically, a small portion of the total volume is sampled by a tube leading to the rotometer. It is a standard technique to use a relatively inexpensive rotometer and calibrate the rotometer readings to provide true air flow.

The high volume air sampler is usually operated over a predetermined period of time such as, for example, a twenty-four hour period. An initial flow reading is taken and also a final flow reading. From these two readings, an average air flow can be calculated. The filter is also weighed at the beginning and end of the test period. The weight that is collected in the filter is the difference between the initial and final weights. With these values a weight concentration can easily be calculated giving a value of weight of particulate that is collected per total air flow.

The prior art calibrator is provided with a series of resistance plates. It is quite common to use five resistance plates, each of which must be sequentially installed and removed from the calibrator. Their installation and removal requires the unscrewing of the large knurled ring at the base of the instrument, the insertion of the resistance plate, the careful positioning of two gaskets usually, and a rethreading of the knurled ring. Thus, with the prior art device this is a time consuming and inconvenient process.

Accordingly, one object of the present invention is to provide an improved flow resistance calibrator that obviates the prior art problem of using a number of different size resistant plates. In accordance with the present invention only two plates are employed, one of which is fixed and the other one of which is rotatable relative to the fixed plate to provide different air flow values.

A further object of the present invention is to provide an improved variable flow resistance calibrator wherein the flow can be set to virtually any value by a fine adjustment between the plates.

Still a further object of the present invention is to provide a variable flow resistance calibrator that is relatively simple in construction, can be made relatively inexpensively, is durable, and can be operated quite simply.

SUMMARY OF THE INVENTION

To accomplish the foregoing and other objects of this invention, there is provided a variable flow resistance calibrator for use in calibrating an air flow indicator such as a rotometer of a high volume air sampler which is typically used in determining the total suspended particulate in the ambient atmosphere. The air sampler includes means for receiving a filter paper but before the sampling takes place, the calibrator of this invention is inserted in place of the filter paper. The calibrator comprises a housing which is of cylindrical shape in the preferred embodiment and defines a chamber having opposite open ends. When the calibrator is secured in the air sampler, the blower of the air sampler is operated and air passes through the chamber of the calibrator. Means are provided at one end of the chamber preferably in the form of a disc for closing the one end of the chamber. This means has porting means associated therewith and the porting means are preferably of fixed area. A pair of plates are disposed in juxtaposition at the other end of the chamber for closing this other end of the chamber. One of the plates is fixed in position and has at least one aperture therethrough. The other plate means is rotatable and also has at least one aperture therethrough. Means including a knob extend through the chamber and the knob is operable from the one end of the chamber for selectively rotating the other plate means. Thus, the pair of plates are relatively rotatable to define different areas of air passage which thereby define a series of different air flows in cubic feet per minute.

Each calibrator has a graph associated therewith. This graph is established by means of a primary standard and is a plot of orifice pressure in inches of water versus flow in cubic feet per minute. Initially, the plate means are positioned for least resistance or maximum flow and a manometer is attached to the chamber to measure orifice pressure. From the predetermined plot true flow can be taken from the plot. At the same time, the observed flow meter reading is taken and a second plot is established which shows a graph of the observed flow meter reading versus the true air flow in cubic feet per minute.

Thereafter, the knob can be rotated slightly to provide increased resistance at a number of predetermined points so that a total curve can be resurrected.

With the arrangement of the present invention, the knob can be set at any one of a number of different settings. There is no limitation on the resistance that can be selected within the usable range. Thus, it is generally easier to operate the apparatus as the knob can be set to a specific exact value of flow rate thus eliminating any interpolation of the flow reading as is necessary with the prior art arrangement.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 is a perspective view showing the calibrator of the present invention in position in a high volume air sampler;

FIG. 2 is a plan view of the calibrator shown in FIG. 1;

FIG. 3 is a cross sectional view taken along line 3—3 of FIG. 2;

FIG. 4 is a bottom view taken along line 4—4 of FIG. 3; and

DETAILED DESCRIPTION

Figure 5:
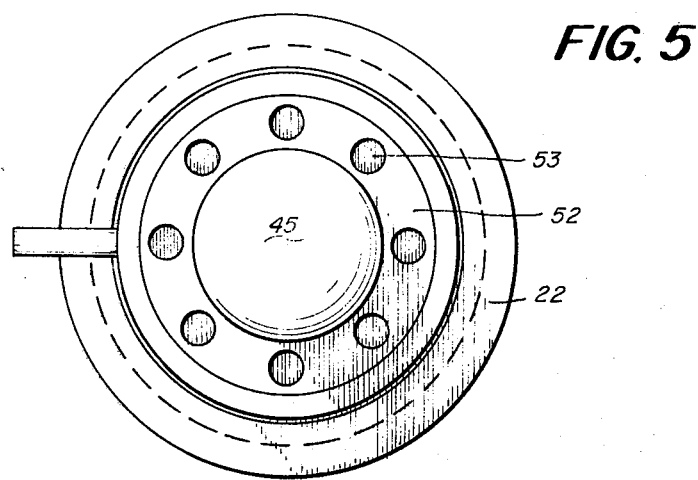
FIG. 5 shows an alternate top view to that shown in FIG. 2.

FIG. 1 is a perspective view of a high volume air sampler 10 with the variable flow resistance calibrator 12 of the present invention in place in the sampler 10. In FIG. 1 only a portion of the air sampler 10 is shown including the main body 14, hold down frame 16, and roof 18. The roof 18 is hinged from the main body by means of hinges 19 and when the air sampler is in use, the roof is pivoted to cover the main body 14. When the sampler is being calibrated the roof is preferably in the position shown in FIG. 1.

The air sampler is a conventional device and typically also includes a motor driven fan or blower and a rotometer which usually is relatively inexpensive and simple device that samples a portion of the air volume and provides a reading, the value of which is calibrated by the device of the present invention.

The prior art device may be of cylindrical shape and is provided with a number of different aperture plates for providing different values of air flow through the calibrator. By knowing the flow characteristics of the calibrator, one can establish a plot of true air flow in cubic feet per minute versus observed flow meter reading by sequentially substituting each of the aperture plates one at a time. However, with the present invention, the same type of a plot can be established without the need for substituting aperture plates. In accordance with this invention the different sequential air flow readings can be taken simply by selectively rotating a knob.

The rotometer may be a relatively simple device comprising a tube having a weighted ball contained therein. The ball is raised to different heights in accordance with the volume of air that is sampled. The tube may have graduation therealong which generally indicate the air flow in cubic feet per minute. However, these readings must be calibrated with a calibrator as of the present invention for correlating the reading on the rotometer with the true air flow in cubic feet per minute.

The calibrator 12 of the present invention is shown in its preferred form in more detail in FIGS. 1–4. The calibrator comprises a cylindrical body 20 and an internally threaded support base 22. The support base 22 has an open center area that receives the cylinder 20 and is movable relative to the cylinder 20.

When the sampler is in use and the calibrator is not disposed in the sampler, then the hold down frame 16 secures a filter paper within its open center section. However, when calibration is taking place as in FIG. 1, the hold down frame 16 secures down an adapter plate 24 having a central aperture defined by a threaded ring which engages with the internally threaded support base 22. The ring that forms a part of the adapter plate is simply an annular upwardly extending wall that is externally threaded and defines an aperture for the air to flow through. When the support base 22 is threaded onto the threaded ring, the threading is preferably hand tight and the top of the ring seats against the annular gasket 26.

The calibrator also comprises a fixed circular aperture plate 30 having four apertures 32 disposed at 90° intervals about the plate, and rotatable aperture plate 34 also having four apertures 36 equally spaced at 90° intervals about plate 34. A stop 38 which may be in the form of a hex nut and bolt is secured through the plate 30 and limits the rotation of the plate 34 between the position shown in FIG. 4 wherein there is minimum air flow and a second position wherein there is maximum air flow and the apertures 32 and 36 essentially coincide.

A disc 40 is supported at the top end of cylindrical body 20 by means of three or more set screws 42 which extend through the wall of the body 20 and into engagement with small recesses or tapped holes in the side wall of the disc 40. The disc 40 defines with the inner surface of the body 20 an annular aperture 43 which provides a sufficient area for air flow into the calibrator. The prior art calibrator is provided with a centrally disposed aperture and the annular aperture 43 is constructed to have a like total area as the area of the central aperture in the prior art calibrator. A knob 45 is provided coupled to shaft 46 which extends through the center of disc 40. The bottom of shaft 46 is secured by means of cap screw 48 to the rotatable plate 34. In this way, the knob 45 can be revolved which in turn causes rotation of the movable plate 34 relative to the fixed plate 30. The plate 30 may be fixed to the body 20 by suitable means such as a screw that extends through the plate 30 into the wall of the body 20. The knob 45 may also be suitably secured to the top of shaft 46 by a threaded interengaging conventional connection.

A duct 50 also extends outwardly from the top end of the cylindrical body 20. A manometer may be connected to the duct 50 for measuring the orifice pressure through the cylindrical body at different settings of the air flow as determined by knob 45.

FIG. 5 is a top view similar to that shown in FIG. 2. In FIG. 5 like reference characters will be used to identify like parts shown in FIG. 2. Thus, in the embodiment of FIG. 5 the entire structure can be the same as shown in FIGS. 2–4 except that the disc 40 is replaced by a fixed plate 52 having the shaft 42 extending therethrough with the knob 45 attached to the shaft 46. The plate 52 may even forcibly fit within the top end of the cylindrical body 20 and preferably have a series of apertures 53 which totally cover an area like the area covered by the annular aperture 43, shown in FIG. 2.

When the high volume air sampler is in use, the adapter plate 24 is replaced by a filter. The sampler is operated over a predetermined period of time and the filter is weighed both at the beginning of the sample period and at the end of the sample period. By recording the true air flow through the sampler at the beginning and end of the sample period, one can easily determine the weight concentration which is a ratio of the weight collected to the total air flow. However, in order to accurately determine the air flow in cubic feet per minute the gage on the rotometer of the air sampler must be calibrated.

The variable flow resistance calibrator of this invention is actually a secondary calibration standard which has been calibrated against a primary standard and thus each calibrator is identified by its own characteristic of orifice pressure in inches of water versus flow in cubic feet per minute. Each calibrator is provided with a graph showing the curve relating these two parameters. When the calibration initially starts, the knob 45 may be rotated so that all of the apertures 32 align with the apertures 36 and provide the least resistance to air flow. The air sampler is preferably operated for an initial period of time so that the device can stabilize. A manometer is then attached at the duct 50 and a pressure reading is obtained. The plot of orifice pressure versus flow then provides an exact flow measurement in cubic feet per minute corresponding to the orifice pressure indicated on the manometer. For example, the true flow may be 42 cfm and yet the rotometer indicator may read a flow of 40 cfm. These two values now essentially represent a single point on a plot that can be resurrected of true air flow in cubic feet per minute versus observed flow meter reading. Other points on this plot can be obtained by sequentially rotating the knob 45 to different air resistance values. Each time a different orifice pressure is obtained and a corresponding true flow can be read from the graph associated with the calibrator. It is possible to make some slight adjustment of the rotometer at the rotometer itself. Thus, if the first reading is drastically different from the true reading of flow, this adjustment can be made so that at least at the first reading the two values are relatively close. However, this adjustment is made only once and is made primarily for the purpose of tending to at least partially equalize the observed flow meter reading and the true air flow.

Again, with the prior art device, these readings were quite cumbersome to take as the different size aperture plates had to be substituted one after the other. However, with the present invention, it is quite easy to rotate the knob 45 to the different positions. Also, it is advantageous to rotate the knob until an exact manometer reading is obtained which makes the operation quite a bit easier to perform.

Having described a limited number of embodiments of the present invention, it should now become apparent to those skilled in the art that numerous modifications can be made in these embodiments, all of which are contemplated as falling within the scope of the present invention. For example, the plates 30 and 34 may have different shaped apertures therein. These apertures could be square, rectangular or eliptical in shape. Also, only a single aperture could actually be used in each plate. In another embodiment the apertures 53, shown in FIG. 5, may have different shapes.

What is claimed is:

1. A variable flow resistance calibrator for calibrating the air flow of a high volume air sampler used in determining the total suspended particulate in the ambient atmosphere, said calibrator comprising;
    means defining a chamber having opposite open ends and through which air passes in calibrating the sampler,
    disc means at one end of the chamber partially closing the one end and defining an input porting area through the one end of the chamber,
    means disposed at the other end of the chamber partially closing the other end and including a fixed means having at least one aperture therethrough and rotatable means having at least one aperture therethrough,
    and means extending through the chamber and the disc means for selectively rotating the rotatable means from the one end of the chamber to vary an output porting area which is a function of the relative position between the fixed and rotatable means.

2. A calibrator as set forth in claim 1 wherein the rotatable means and fixed aperture means are in contacting juxtaposition.

3. A calibrator as set forth in claim 2 wherein the means for selectively rotating includes a shaft means extending through the chamber between opposite ends and knob means secured to the shaft means, said shaft means also being secured to the rotatable means.

4. A calibrator as set forth in claim 3 wherein said disc means at one end of the chamber includes a disc defining with the means defining a chamber an annular aperture.

5. A calibrator as set forth in claim 4 wherein said knob means is secured to the shaft that passes through the disc.

6. A calibrator as set forth in claim 1 wherein said disc means at one end of the chamber includes a plate having at least one aperture therethrough along an outer circumferential locus of the plate means.

7. A calibrator as set forth in claim 6 wherein the means for selectively rotating includes shaft means extending between the center area of the plate means and the rotatable means and knob means secured to the shaft means above the plate means.

8. A calibrator as set forth in claim 1 including stop means for limiting rotation of the rotatable means.

9. A variable resistance calibrator for calibrating the flow indicator of an air sampler comprising;
    a housing having opposite ends, one end of which is for coupling to the air sampler and the other end of which defines a restricted input porting area for receiving air which passes through the chamber defined by the housing,
    means disposed adjacent the one end of the housing partially closing the one end of the housing and rotatable for providing a variable output porting area,
    control means for selectively operating the means for providing a variable output porting area,
    and stop means associated with the means for providing a variable output porting area for limiting the output porting area between a maximum output porting area and a minimum output porting area greater than zero area.

10. A variable flow resistance calibrator for calibrating the air flow of a high volume air sampler used in determining the total suspended particulate in the ambient atmosphere, said calibrator comprising;
    means defining a chamber having opposite open ends and through which air is passed in calibrating the sampler,
    means at one end of the chamber partially closing the one end and defining porting means therethrough of fixed area,
    a pair of plate means disposed in juxtaposition at the other end of the chamber partially closing the other end,
    one of said plate means being fixed in position and having at least one aperture therethrough,
    and means extending through the chamber and the means at the one end of the chamber and operable from the one end of the chamber for selectively rotating the other plate means.

11. A variable flow resistance calibrator for calibrating the air flow of a high volume air sampler used in determining the total suspended particulate in the ambient atmosphere, said calibrator comprising;
    means defining a chamber having opposite open ends and through which air passes in calibrating the sampler, plate means at one end of the chamber partially closing the one end and defining an input porting area through the one end of the chamber, means disposed at the other end of the chamber partially closing the other end and rotatable for providing a variable output porting area through the other end of the chamber, and control means for selectively operating the means for providing a variable output porting area.

12. A calibrator as set forth in claim 11 wherein said control means includes means extending through the chamber from the means for providing a variable output porting area to the one end of the chamber and through an opening in the plate means.

13. A calibrator as set forth in claim 12 wherein said means extending through the chamber comprises an operating shaft having a knob secured thereto disposed outside the plate means at the one end of the chamber.

14. A calibrator as set forth in claim 13 wherein said plate means has at least one aperture therethrough along an outer circumferential locus of the plate means.

15. A calibrator as set forth in claim 13 wherein said plate means comprises a disc defining with the means defining a chamber an annular aperture defining the input porting area.

16. A calibrator as set forth in claim 12 wherein said means for providing a variable output porting area comprises a fixed plate having at least one aperture therethrough and a rotatable plate having at least one aperture therethrough, said means extending through the chamber connecting to the rotatable plate for varying the output porting area.

17. A calibrator as set forth in claim 11 wherein said means defining a chamber comprises a cylindrical member and said control means comprises a control shaft extending through said cylindrical member with said plate means supported orthogonally to the axis of said cylindrical member.

18. A calibrator as set forth in claim 11 wherein said input porting area is at least as large as the maximum setting of the output porting area.

19. A calibrator as set forth in claim 11 wherein said input porting area is comparable to the maximum setting of the output porting area.

20. A calibrator as set forth in claim 11 wherein said input porting area is substantially smaller than the total cross sectional area of the means defining the chamber.

* * * * *